US007004221B2

(12) United States Patent
Moore, Jr. et al.

(10) Patent No.: US 7,004,221 B2
(45) Date of Patent: Feb. 28, 2006

(54) MOLD COMPONENTS HAVING A CONFORMAL THERMAL MANAGEMENT SYSTEM AND METHODS FOR MANUFACTURING SAME

(75) Inventors: Roy E. Moore, Jr., Killingworth, CT (US); Daniel J. Swistak, Newmarket, NH (US)

(73) Assignee: Infiltrator Systems, Inc., Old Saybrook, CT (US)

( * ) Notice: Subject to any disclaimer, the term of this patent is extended or adjusted under 35 U.S.C. 154(b) by 392 days.

(21) Appl. No.: 10/186,958

(22) Filed: Jul. 1, 2002

(65) Prior Publication Data

US 2003/0025240 A1 Feb. 6, 2003

Related U.S. Application Data

(60) Provisional application No. 60/302,320, filed on Jun. 29, 2001.

(51) Int. Cl.
B22D 15/00 (2006.01)
(52) U.S. Cl. .............................. 164/6; 164/11; 264/219
(58) Field of Classification Search .................. 249/79; 264/219, 279.1, 220; 164/6, 11, 19
See application file for complete search history.

(56) References Cited

U.S. PATENT DOCUMENTS 2,295,858 A * 9/1942 McWane ...................... 249/79
3,784,152 A * 1/1974 Garner et al. ................ 249/80
4,627,946 A * 12/1986 Crabtree ...................... 264/51
5,358,211 A * 10/1994 Sterett ......................... 249/80
5,562,846 A * 10/1996 McKeen ....................... 249/79

OTHER PUBLICATIONS

Kuhn, Kelin J., "The Basics of Manufacturing Technology", www.ee.washington.edu/conselec/CE/kuhn/manufact/95x2.htm, 1-19, Jun. 19, 2000.
Luther, Norris B., "Metalcasting and Molding Processes", www.castingsource.com/tech_art_metalcasting.asp, 1-12, Jun. 19, 2000 "ME5260-Laboratory Exercises-Summer, 1998", www.me.unm.edu/courses/me5260-summer/5260labexercises.html, 1-10,.
"ME5260-Laboratory Exercises- Summer, 1998", www.me.umn.edu/courses/me5260-summer/5260labexercises.html, 1-10, Jun. 19, 2000.
"Some Information on the Investment Casting Process", www.foseco.com.au/foundry/invest/info.htm, 1-3, Jun. 19, 2000.
"The Investment/Lost Wax Casting Process", www.implog.com/foundry/foundicp.htm, 1-2, Jun. 19, 2000.

* cited by examiner

Primary Examiner—Allan R. Kuhns
(74) Attorney, Agent, or Firm—Cantor Colburn LLP

(57) ABSTRACT

A method for manufacturing a mold component having a conformal thermal management system comprises forming a first mold segment and a second mold segment, each comprising a surface having a profile defined by the surface. A channel pattern is disposed beneath the profile defined by the surface in at least one of the first mold segment and second mold segment. The first mold segment and second mold segment are aligned to form a network of channels. The first mold segment and second mold segment are joined together to form the mold component.

21 Claims, 3 Drawing Sheets

MOLD COMPONENTS HAVING A CONFORMAL THERMAL MANAGEMENT SYSTEM AND METHODS FOR MANUFACTURING SAME

CROSS REFERENCE TO RELATED APPLICATION

This application claims the benefit of U.S. Provisional Application Ser. No. 60/302,320 filed Jun. 29, 2001, the entire content of which is incorporated herein by reference.

TECHNICAL FIELD

This disclosure relates to molding processes and, more particularly, to mold components having conformal thermal management systems and methods for manufacturing the same.

BACKGROUND

Industries specializing in injection molding, gas-assisted injection molding, structural foam molding, blow molding, and thermoforming processes strive continuously to mold articles at faster cycle times. When scrutinizing the cycle time and methods to shorten it, the focus typically falls upon the cooling process, as it is generally the longest part of any cycle. One approach to shortening the cycle time is directed to the mold components (i.e., cavity, core, slides, lifters, etc.). Mold components are generally constructed using blocks of metal. The profile or details of the molding surface are typically cut into the metal blocks. Channel patterns, e.g., cooling/heating channels, are then drilled from various angles such that the channels intersect one another to form cooling/heating circuits. One drawback of the resulting mold component is that the channels are drilled at straight lines into the metal, and the resulting channel patterns oftentimes do not conform to the shape of the intended molded article. This non-conformity causes uneven heat transfer between the mold component and molded article, thus making it difficult to mold products at a faster cycle time and compromising the quality of the molded article (i.e., causing different shrinkage rates due to hot and cold spots in the molded article, warpage, and the like).

SUMMARY

A method for manufacturing a mold component having a conformal thermal management system comprises forming a first mold segment and a second mold segment, each comprising a first surface having a profile defined by the first surface. A channel pattern is disposed beneath the surface defined by the profile in at least one of the first mold segment and second mold segment. The first mold segment and second mold segment are aligned. The first surfaces of the first mold segment and second mold segment are joined together to form the mold component.

A mold component having a conformal thermal management system comprises a first mold segment and a second mold segment disposed in operable communication with each other, wherein each mold segment further comprises a first surface having a profile. A network of channels is disposed between the first mold segment and second mold segment.

A method for molding an article comprises introducing a molten molding material to a mold cavity comprising a mold component comprising a network of channels that conform to a profile. A fluid is passed through the network of channels. The molding material is cooled to below a softening point temperature of the molding material to form the article. The article is then removed from the mold.

The above described and other features are exemplified by the following figures and detailed description.

BRIEF DESCRIPTION OF THE DRAWINGS

Referring now to the figure wherein the like elements are numbered alike.

DETAILED DESCRIPTION

A mold component (e.g., cavity, core, slides, etc.) having a conformal thermal management system comprises one or more mold segments each having a conformal thermal management system, i.e., a network of channel patterns disposed beneath profiles defined by surfaces of the mold segments at which an article is formed. The channel patterns (which can optionally be formed by tube(s)) are disposed in a conformal relationship to the pattern (e.g., the design or profile) to be molded and can be disposed between adjacent mold segments or in a single mold segment. The conformal relationship is defined by the spatial constraints of the mold segments and the positioning of the network of channel patterns such that heat is controllably transferred between the profile and the channel patterns in response to the thermal requirements of a molding process in which the mold component is utilized.

Figure 2:
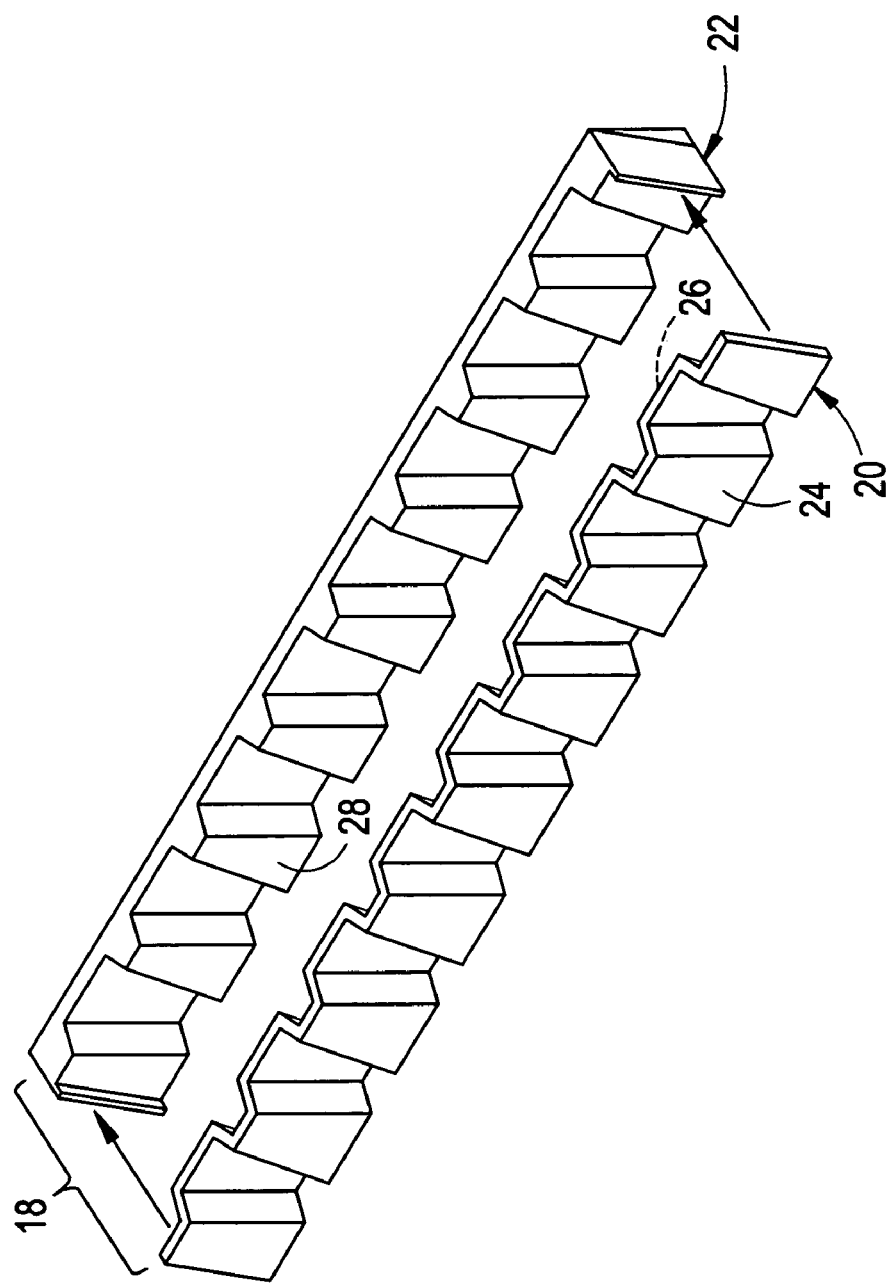
FIG. 2 is a perspective view depicting exemplary embodiments of a pair of segments used to make a mold component.

Referring to FIG. 2, one method for manufacturing a mold component 18 having a conformal thermal management system comprises manufacturing two or more mold segments, such as a shell 20 and a plug 22. The first mold segment, e.g., the shell 20, comprises an exterior surface 24 (profile surface of the article to be molded) and an interior surface 26. The first mold segment further comprises a portion, (e.g., all, half, or some other portion) of a channel pattern, which is disposed along and beneath the profile surface (on the interior surface 26 of the shell 20) and substantially conforms to the contours of the profile. A second mold segment, such as a plug 22, comprises an exterior surface 28, which corresponds to the interior surface of the shell, and possibly to an interior surface. The second mold segment 22 also further comprises the remainder of the channel pattern (e.g., none, a half, or the appropriate remaining portion), which is disposed along and substantially conforms to the profile of the interior surface 26 of the first mold segment 20. The mold segments are placed together with the channel pattern portions in alignment, and sealed together to form the mold component 18. Access to the channel pattern can then be obtained via machining if access to the surface was not retained. The patterns comprising the details of the molded article can optionally be finish machined after assembling the mold segments.

Figure 1:
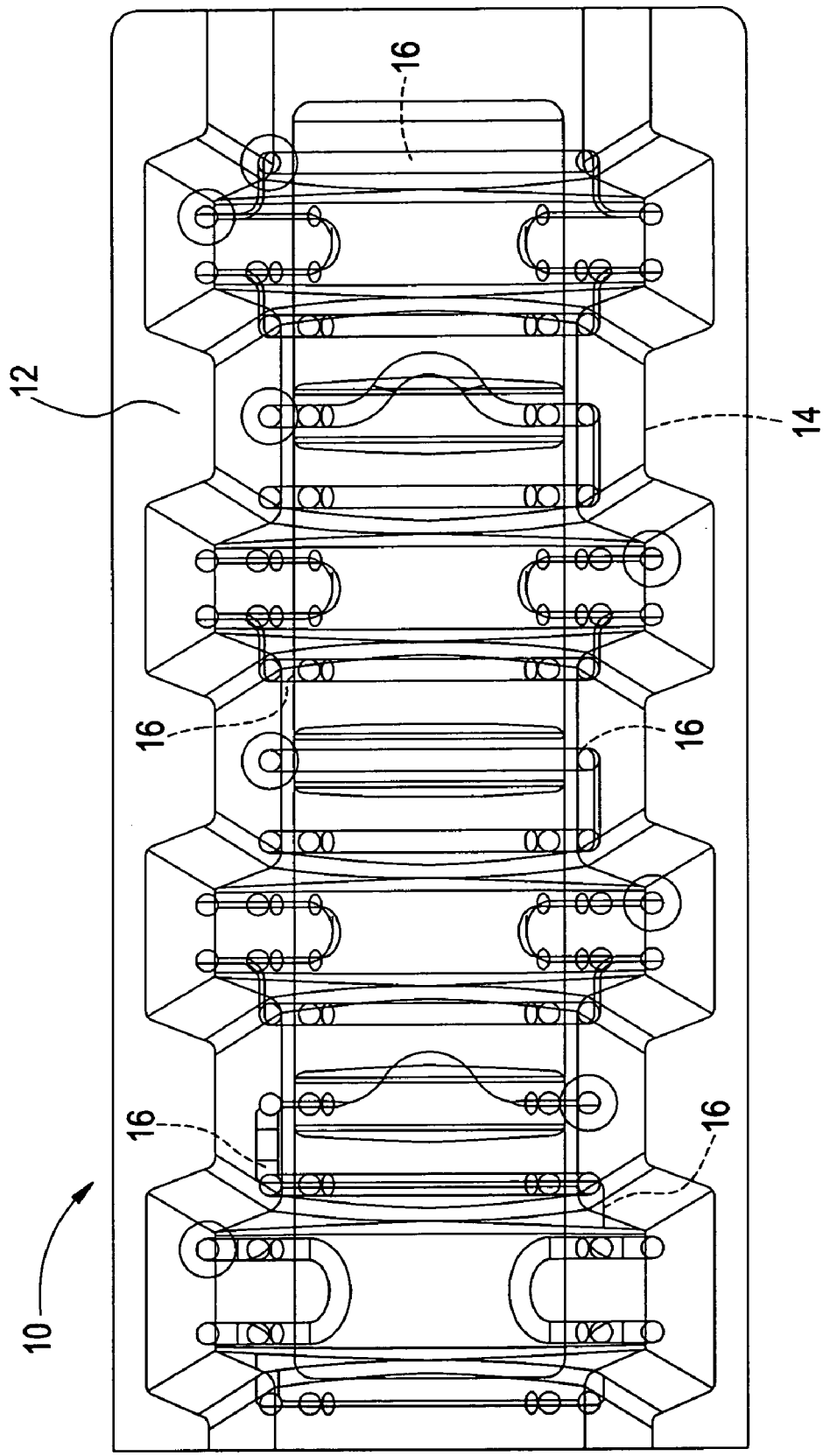
FIG. 1 is a top view of an exemplary embodiment of a mold component having a conformal thermal management system.

Referring to FIG. 1, another method for manufacturing a mold component 10 having a conformal thermal management system can comprise manufacturing two or more mold segments having profiles, such as a shell 12 and a plug 14 as described above, and placing one or more tubes 16, or tubing, into the channel patterns that substantially conform to the profiles, prior to sealing the first and second mold segments together. The mold segments and tubing are sealed together to form an assembly.

In the alternative, a mold segment, such as a plug, can be replaced with a material such as a filler, a cover, a layer of material, as well as combinations comprising at least one of the foregoing materials, and the like.

In yet another alternative embodiment, the mold components having tubing assemblies can be manufactured using a male or female pattern. A layer(s) of metal is deposited (e.g., electrodeposited, or the like) on the pattern. Tubing is then disposed on the metal layer(s). Subsequent layer(s) of metal are then disposed over the tubing. The pattern is then removed, forming the mold segment.

The methods for manufacturing mold components having conformal thermal management systems can vary according to the intended use of the mold component. For example, a mold component requiring no further machining to its profile surface other than accessing the channel pattern can be manufactured according to the above-mentioned methods. Alternative methods are also disclosed where the mold component can undergo additional machining on its exterior or profile surface(s) in addition to accessing the channel pattern.

When manufacturing a mold component that does not require additional machining, the mold segments can be manufactured using several methods such as casting (e.g., sandcasting, investment casting, combinations comprising at least one of the foregoing methods, and the like), additive process (e.g., plating, electrodeless nickel plating, copper plating, spray metallizing, combinations comprising at least one of the foregoing methods, and the like), as well as combinations comprising at least one of the foregoing methods, and the like.

Figure 3:
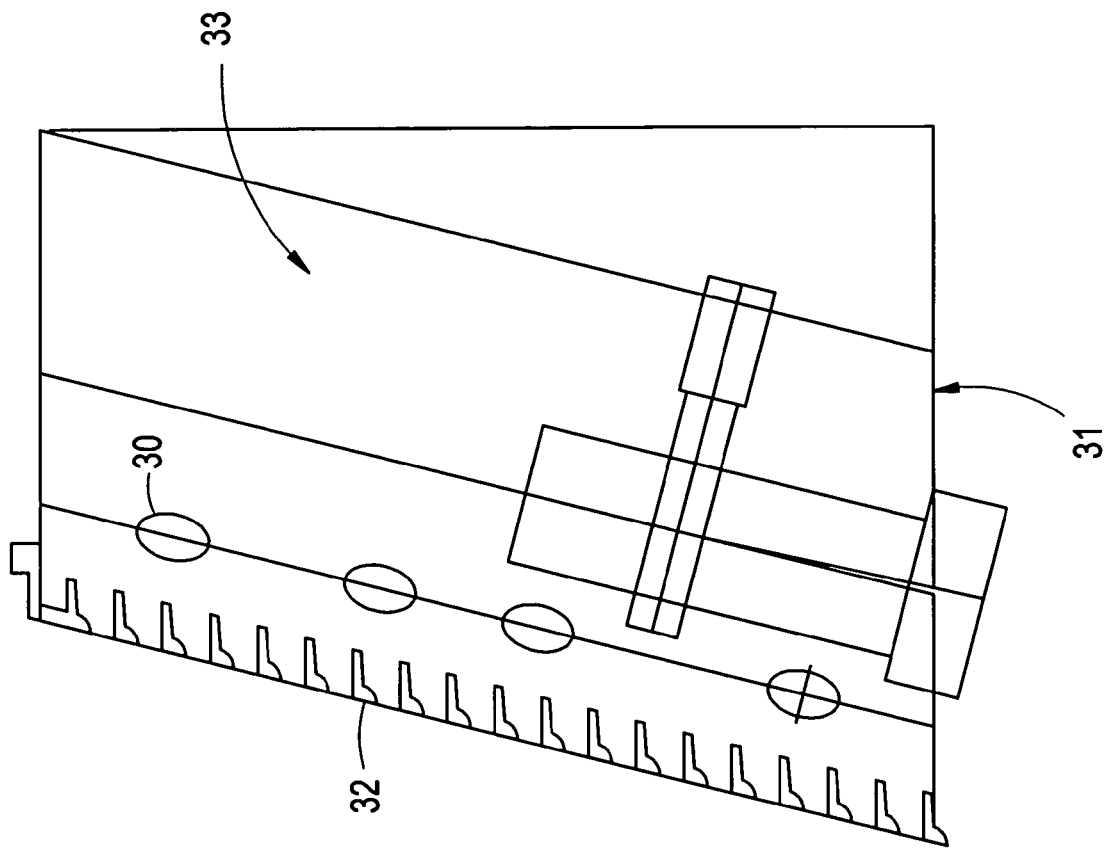
FIG. 3 is a cross section view of a mold component comprised of two segments depicting exemplary embodiments of a channel pattern.

Each mold segment generally comprises a first surface and a second surface, e.g., an interior surface and an exterior surface. Either the first surface or second surface, or both, are defined by a profile surface that comprises details of the molded article. Each mold segment comprises a portion, and preferably half, of a channel pattern that substantially conforms to the profile of the molded article. The channel pattern (as is shown in FIG. 3) comprises one or more grooves 30 having a cross-sectional geometry such as a circular shape or non-circular shape, e.g., oval, elliptical, square, rectangular, other non-circular shapes, and combinations comprising at least one of the foregoing cross-sectional geometries, and the like, with an oval cross-sectional geometry preferred. The grooves of the channel patterns can be machined, casted, or otherwise disposed, as well as combinations comprising at least one of the foregoing methods, and the like, into the mold segment. For example, a mold component 31 having a conformal thermal management system can comprise two segments (e.g., a shell 32 and a plug 33), such that the plug inserts into the interior of the shell (i.e., the cavity of the shell) with each segment optionally comprising one or more parts. The interior surface of the shell comprises a profile (female) having one half of the channel pattern 30 substantially formed into its surface. The exterior surface of the plug comprises a complimentary profile (male) having the other half of the channel pattern that compliments the profile of the shell and the channel pattern. Once assembled (e.g., plug into shell) the mold component comprises a profile (e.g., male, i.e., the second side of the shell), with a channel pattern conforming to the geometry of that profile and preferably disposed at a constant distance from the profile surface with some distance variations, e.g., for small profile details, being acceptable.

The mold segments can be welded together to form a mold component. For example, the plug can be inserted into the shell such that the profiles and channel patterns substantially align and form a channel or a network of channels for the conformal thermal management system. Once the channel patterns are substantially aligned, the mold segments can be welded together, e.g., using a method such as electron-beam welding ("E-beam"). E-beam welding is preferred because a hermetic seal forms between the segments without the application of excessive heat to the segments, e.g., heat that could cause warping of the finished mold component. The mold component can then be machined to access the channel pattern of the conformal thermal management system. More particularly, the exterior of a welded mold segment such as the shell can be drilled and/or tapped to access the channel pattern.

In the above and other embodiments of the conformal thermal management system, the channel pattern preferably substantially conforms to the profile of the mold segment. More specifically, the mold segment profiles and/or patterns comprise the physical features of at least a portion of the article to be molded, i.e., the positive physical features or negative physical features. These features can include raised/elevated areas, depressions, recessions, ridges, and the like, that comprise the physical features of the appearance side or the interior of the molded article, as is desired. The channel patterns are preferably formed along the contours of these features, such that the channels follow the contours of the physical features. The channel patterns are disposed along the contours of the features such that when the mold segments are joined together, a continuous passageway, or passageways, is formed throughout the mold component. The passageway(s) is disposed a distance from the profile, where the distance remains relatively constant throughout the entire mold component. More particularly, the passageways are disposed along the contours of the features of the profile within a distance from the surface of the features of less than or equal to about 3 inches (about 76 millimeters (mm)), preferably less than or equal to about 1.5 inches (about 38 mm), more preferably less than or equal to about 1 inch (about 25.4 mm), and even more preferably about 0.5 inches (13 mm) to about 1 inch. The distance between the channels and the profile, as well as the cross-sectional geometries of the channels, is dependent upon the desired amount and rate of cooling desired.

Another alternative method for manufacturing a mold component that does not require additional machining to its exterior surface, other than accessing the channel pattern, comprises first manufacturing one or more mold patterns having profiles, depositing channels (e.g., tubing networks) on the profile surfaces, and subsequently depositing layers of metal over the channels. When two or more mold patterns are being manufactured, the profiles are preferably complementary male and female patterns. A first layer(s) of a first metal is deposited upon the pattern. The deposition technique can comprise metal plating techniques (e.g., electroplating), spray metallizing, and combinations comprising at least one of the foregoing methods, and the like.

The metals that are employed for the metal layers (and/or the various mold segments) and the tubing employed in the various embodiments described herein are preferably compatible, i.e., comprise at least one common metal, to enhance bonding and structural integrity. The tubing and each layer can individually comprise copper, beryllium, aluminum, mixtures, alloys and combinations comprising at least one of the foregoing metals, and the like, with either a beryllium-copper alloy or mixture preferred for the layers and the tubing, or a beryllium-copper alloy or mixture preferred for the layers with copper preferred for the tubing.

One or more tubes are disposed on the first deposited layer(s) of metal on the profile of the mold pattern, preferably disposed along the contours of the profile surface. A second layer(s) of metal is then deposited over the first metal layer(s) such that the tubing is disposed between the first and second metal layers. The second deposited metal layer bonds with the tubing and first deposited metal layer to form a mold component. The resulting mold component is then removed from the pattern. Preferably, a second mold component, e.g., one that is complimentary to the first mold component, can be manufactured using the same method, or other methods such as machining, casting, additive process, and combinations comprising at least one of the foregoing methods, and the like. The second mold component can then be disposed in operable communication with the first mold component to form the mold. For example, the first mold component will comprise a negative of the outer surface of the article to be molded while the second mold component will comprise a negative of the inner surface.

The first metal layer comprises a metal, alloy, or mixture that is preferably homogeneous with the composition of the mold segment and/or tubing. More particularly, the mold segment and tubing comprise a second metal, and at least a portion of the first metal comprises the second metal. The second metal can be a metal, alloy or mixture such as copper, aluminum, beryllium-copper, and alloys and combinations comprising at least one of the foregoing types of metals, and the like. For example, the first metal forming the first segment can be high conductivity and high hardness beryllium copper, and the second metal comprising the second segment could be low conductivity and low hardness beryllium copper, while the metal comprising the tubing could be pure copper. Alternatively, the first metal forming the first segment can be high conductivity and high hardness beryllium copper, and the second metal comprising the second segment could be aluminum, while the metal comprising the tubing could be pure copper.

The beryllium-copper alloy can comprise about 95% to about 99.5% by weight of copper based on the total weight of the mold segment, and about 0.5% to about 5% by weight of beryllium based on the total weight of the mold segment. In the alternative, the beryllium-copper alloy can comprise up to about 98% by weight of copper based on the total weight of the mold segment, and up to about 2% by weight of beryllium based on the total weight of the mold segment. Beryllium-copper alloys comprising greater than about 5% beryllium by weight based on the total weight of the mold segment can be brittle and not suitable for manufacturing many types of molds.

In the alternative, when manufacturing a mold component that requires additional machining to its exterior surface other than accessing the channel pattern, the mold segments can be manufactured using various machining methods or one or more of the above-described methods such as casting, additive process, and combinations comprising at least one of the foregoing methods, and the like. Where additional machining will be employed, the mold segment comprises a partial profile, comprising at least a portion of the details of the molded article, on either the interior surface and/or exterior surface accordingly. Once formed into a mold component, as described above, the partial profile can be finish machined to a complete profile.

In the various embodiments, when disposing the tubing on the surface of the mold segment, the tubing can be manipulated to substantially conform to the profile such as by bending, heat forming, and combinations comprising at least one of the foregoing methods, and the like. The mold segments can be joined (e.g., inserting a plug into a shell such that the profiles substantially align) and welded to encapsulate the tubing. The mold segments and tubing can be blended together to eliminate air gaps between the individual pieces and to prevent possible leakage of molding material from the mold segment by undergoing a pressing process, e.g., a hot isostatic pressing process ("HIP process"), to form the mold component.

The HIP process comprises placing the welded mold segments and tubing assembly into a pressure vessel containing an inert atmosphere such as argon gas or other inert gas that is non-reactive with the composition of the mold segments and/or tubing. The pressure vessel is operated at a sufficient pressure to press and blend the segments and tubing together and remove or eliminate any air gaps, e.g., a pressure of up to about 20,000 pounds per square inch ("psi"), with about 10,000 psi to about 20,000 psi preferred, and about 14,000 psi to about 16,000 psi more preferred for most metals employed. In one embodiment, the mold segments and tubing assembly are placed in the pressure vessel, while the pressure within the pressure vessel is held constant and the temperature is increased from about 350° C. to about 800° C., and preferably from about 425° C. to about 600° C., for a time period of about 4 hours to about 24 hours, preferably about 6 hours to about 12 hours. The constant pressure and increased temperature isostatically press the mold segments and tubing together to blend them, eliminate air gaps, and to prevent possible leakage. The HIP process can enhance the densification of the segments and tubing to create a mold component having a homogeneous composition. After "HIPing" the mold segments and tubing, the assembly can optionally undergo additional machining.

In the alternative to employing two or more mold segments (or metal layers) to form a mold component, such as a plug and a shell, that employ HIPing, a mold segment can be eliminated. For example, rather than inserting a plug into a shell, a single segment can be employed having a profile or at least one surface, with the surface opposite the profile surface either forming a hollow area or an area having channels. Tube(s) can be disposed on and/or into the second surface (e.g., laid across the surface or disposed in the channels). A first metal can then be casted into the cavity or to fill the remainder of the channels, thereby encapsulating the tubing. As described above, the tubing and metal are preferably compatible. A metal plate, or other metal cover, can be attached (e.g., bolted, secured welded, or the like) to the shell in order to seal the assembly in preparation for HIPing. The mold segment, tubing, and metal fill are then HIPed, i.e., undergo the HIP process, to eliminate air gaps between the individual components and prevent possible leakage of the mold segment assembly. Since the metal can be employed in any form, e.g., as a powder, HIPing can further melt the first metal, blending the metal, tubing and segment to form the mold component. After performing the HIPing step, the assembly can optionally undergo additional machining.

Yet another alternative to employing two or more mold segments, such as a plug and a shell, comprises casting the mold component around the tube(s). For example, when employing a sandcasting method, one or more tubes can be placed into a foundry flask, and casted inside the resulting mold segment. Generally, the sand casting process begins by fabricating a pattern for the intended final object, i.e., the mold component. For example, a single or multi-piece pattern is disposed in a foundry flask, e.g., comprising two halves, such that one half of the pattern is inserted into each half of the foundry flask, and the foundry flask is assembled. The foundry flask is filled with a quantity of sand until the sand is packed tightly about the pattern. The foundry flask is then disassembled, the pattern is removed, and the details of the profile of the mold component embedded in the sand are checked. One or more tubes can be disposed in the sand, and preferably along the contours of the profile within a distance of about 0.0625 inches (1.6 mm) to about 3 inches (76 mm) from the profile, preferably about 0.5 inches (13 mm) to 1.5 inches (38 mm). The flask containing the sand pattern of the mold component fitted with tubing can be reassembled and filled with molten metal. Once the metal cools, the flask is disassembled to remove the cast mold component having one or more tubes for a conformal thermal management system cast therein. The tubes can be disposed along the contours of the profile such that they substantially conform to the contours of the profile and casted on a surface opposite the surface comprising the profile or encapsulated within the mold component.

When two mold segments are employed, the mold segment comprising both a positive and negative of the pattern also preferably possesses a uniform thickness. For example, the shell can have a uniform thickness of about 0.125 inches (3.18 mm) to about 3 inches (76 mm), and preferably a uniform thickness of about 0.5 inches (13 mm) to about 1 inch (25.4 mm).

The thickness of the mold segment combined with the conductivity value of the metal or alloy comprising the mold segment also improves the cooling capabilities of the mold component. For example, aluminum, copper, and beryllium-copper alloys have conductivity values of about 90 British thermal units per foot hour degree Fahrenheit (BTU/ft hr ° F.) to about 100 BTU/ft hr ° F., about 250 BTU/ft hr ° F. to about 310 BTU/ft hr ° F., and about 60 BTU/ft hr ° F. to about 140 BTU/ft hr ° F., respectively. In contrast, stainless steels generally have conductivity values of about 14 BTU/ft hr ° F. A higher conductivity value indicates the material has a greater ability to absorb and transfer heat. Generally, the molds constructed using the conformal cooling method maintain a uniform temperature throughout the entire mold. A temperature (delta T) of less than or equal to minus 10° C. across the entire molded article is common, and a delta T of less than or equal to minus 16° C. across the entire molded article is attainable.

The mold component can comprise two mold segments such as a shell and a plug. For example, as illustrated in FIG. 1, a mold component 10 can comprise a shell segment 12 and a plug segment 14. When the shell segment 12 and plug segment 14 are joined together, the channel patterns 16 of each segment substantially align to form the conformal thermal management system of the mold component.

A mold having a conformal thermal management system comprises one or more mold components having conformal thermal management systems that are placed in operable communication with one another. The resulting molded article produced using this mold can be manufactured faster, i.e., in a shortened cycle time, than other molded articles. A method for shortening the cycle time for molding an article comprises injecting an amount of molding material sufficient for the preparation of a molded article into a mold cavity that comprises mold components, in which the mold comprises a profile having one or more features of the molded article and a network of channels substantially conforming to the profile. A molded article is formed within the mold. A fluid can then be injected under pressure through the network of channels in the mold components, such that the operating temperature of the mold is lowered to a temperature beneath the softening point of the molding material. For example, the molding material can be injected under pressure into the mold cavity at a temperature of about 260° C. to about 370° C. After injecting the fluid into the network of channels, the operating temperature of the mold can be lowered by about 40° C. to about 65° C. to cool the mold cavity and molded article forming therein. After the molded article has formed, the mold is then separated from the molded article, such that the molded article is opened to the atmosphere and removed from the mold.

Furthermore, after removing that molded article and prior to injecting a second quantity of molding material to form another article by injecting a second fluid into the network of channels in the mold components, the operating temperature of the mold can be increased from about 260° C. to about 370° C. to match the temperature of the molding material. By injecting the molding material into a hot mold, the material flow length can increase, allowing the formation of thinner molded sections in the molded article, at lower injection pressures and at faster injection rates. This reduces the amount of molded in stress and also shortens the overall cycle. The mold is then rapidly cooled as described above in order to remove the molded article.

"Molding material" is understood to mean any plastic material that exhibits plastic flow properties under injection molding temperature and pressure conditions. "Molding material" includes all organic and inorganic materials having, with or without additives, thermoplastic characteristics, including certain synthetic organic resins, such as polyethylene and polyvinyl chloride, and the like, which also possess thermoplastic characteristics. Likewise, other resins, such as phenolic resins, and the like, are widely accepted as thermosetting resins, when reacted at a temperature and for a time sufficient to produce the cross-linking necessary to cause them to be considered as substantially thermoset. More specifically, the "molding material" can comprise thermoplastic and thermoset materials, or combinations comprising at least one of these materials, with polyolefin materials (e.g., polypropylenes, polyethylene, and the like) and, more particularly, high density polyethylenes and low density polyethylenes, with high density polyethylenes preferred. Some possible high density polyethylenes are "ALATHON" and "PETROTHENE," commercially available from Equistar Chemicals, Houston, Tex.; "SCLAIR" and "NOVAPOL," commercially available from Nova Chemicals, Pittsburgh, Pa.; "MARTEX" and "PCR," commercially available from Phillips Chemical, Bartlesville, Okla.; and "FORTIFLEX," commercially available from Solvay Polymers, Houston, Tex.; and the like.

The term "fluid" is understood to mean gaseous and liquid pressurizing fluids. Optionally, the second fluid can be the first fluid having a different temperature (i.e., a lower temperature) than when employed as the first fluid. Preferably the second fluid comprises a fluid mixture comprising water and glycol, introduced into the channels to cool or warm the mold.

The methods for manufacturing mold segments comprising a conformal thermal management system provides several advantages such as manufacturing cost savings, use of homogeneous materials, conformal heating/cooling system, and the mass production of mold segments; over other methods for manufacturing molds. First, the beryllium-copper and/or aluminum molds manufactured using these methods are less expensive to produce than machining molds from blocks of steel. In addition, beryllium-copper alloys and aluminum have higher heat dissipation values than steel; thus, both beryllium-copper alloys and aluminum have improved cooling capabilities over steel. As a result, mold segments and molds composed of beryllium-copper or aluminum possess an inherent ability to cool a molded article faster than molds composed of steel, which means molding processes employing these molds fitted with a conformal thermal management system will demonstrate faster cycle times.

Second, these methods preferably utilize homogeneous materials to form molds segments having homogeneous compositions. More specifically, the shell and plug can both be manufactured using a beryllium-copper alloy or an aluminum metal, which makes it easier to weld the two components together. Molds comprising heterogeneous materials, e.g., a nickel or copper mold fitted with stainless steel ductwork, inherently possess drawbacks. One recognized drawback is the heterogeneous mixture of metals and alloys to form the mold component. Since the shell and ductwork comprise different materials, the resulting heterogeneous materials of the mold component will all react differently to thermal expansion. Thus, care is needed to match material expansion rates, or the mold component will fracture during repeated heating and cooling cycles. Consequently, the modular mold having a thermal management system overcomes the disadvantages inherent when employing a homogenous mix of materials.

Third, the channel patterns for the conformal thermal management system are located close to the mold cavity (e.g., less than or equal to about 1 inch, with less than or equal to about 0.75 inches, and less than or equal to about 0.5 inches more preferred and readily attainable) and contoured to the pattern of the molded article. The proximity of the channels to the molded article can provide an additional means for carrying out an additional cooling or heating step that can take place any time during the molding process. For instance, an additional cooling step can be implemented concurrently while injecting an additional quantity of gas (as in gas assist injection molding) into the molded article within the mold cavity. Likewise, an additional heating step can be implemented prior to injecting the molded material into the mold cavity. The additional heating and cooling steps can ensure manufacturing a high quality molded article having a uniform thickness without sink marks, brittle spots or other structural or physical defects. In addition to shortening the cycle time, the operating temperature of the mold can be regulated, i.e., maintained at a temperature approximate to the temperature of the molding material entering the mold, to increase material flow lengths and to mold thinner wall section parts.

The fourth recognized advantage over existing mold manufacturing methods and apparatus involves the ability to create multiple castings of the same segment. The sand casting and investment casting methods, for manufacturing the mold segment can make multiple castings of the same part, which reduces both labor and manufacturing costs. Consequently, if and when a problem arises with the mold, the defective casting segment can be replaced quickly and in a cost efficient manner.

Fifth, implementing hot isostatic pressing to seal the mold can provide a more cost effective means for effectively sealing the thermal management system within the resulting mold segment. Currently, the most widely known method requires several electroplating steps to first prepare the shell for bonding ductwork to its outer surface, and to second bond said ductwork. The ductwork must then be electroplated to the interior shell surface. Additionally, an epoxy resin must be applied over the ductwork and interior surface of the shell to form a smooth, uniform surface. However, the recognized drawback inherent in this method is the resulting mold's susceptibility to layer separation.

Sixth, the interchangeable nature of the castings permits one to remove an existing casting for repairs and alterations and replace it with an identical casting. Finally, using investment cast segments to fashion certain mold components allows one skilled in the art to eliminate costly detail machining and polishing of the mold cavity, thereby reducing manufacturing costs.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for manufacturing a mold component having a conformal thermal management system, comprising:
    forming a first mold segment and a second mold segment, each comprising a first surface having a profile defined by said first surface;
    disposing a channel pattern in at least one of said first mold segment and said second mold segment, said channel pattern being disposed beneath and conforming to said surface defined by said profile;
    aligning said first mold segment and said second mold segment; and
    joining said first surfaces of said first mold segment and said second mold segment by pressing said first mold segment and said second mold segment together in a hot isostatic pressing process to form said mold component.

2. The method recited in claim 1, wherein said forming first mold segment and said second mold segment further comprises a method selected from the group consisting of casting, additive process, and combinations comprising at least one of the foregoing methods.

3. The method recited in claim 1, wherein said disposing said channel pattern further comprises a method selected from the group consisting of machining, casting, and combinations comprising at least one of the foregoing methods.

4. The method recited in claim 1, further comprises accessing said channel patterns by drilling from a second surface of at least one of said first mold segment and said second mold segment to said channel pattern.

5. The method recited in claim 1, wherein said channel pattern is disposed a distance of less than or equal to about 1 inch beneath said surface.

6. The method recited in claim 5, wherein said distance is less than or equal to about 0.5 inches.

7. The method recited in claim 1, wherein said joining said first surfaces forms a continuous passageway throughout the mold component.

8. A method for manufacturing a mold component having a conformal thermal management system, comprising:
- forming a first mold segment comprising a first surface having a profile comprising a detail of an article and a second surface comprising a mold cavity having a negative detail of said profile;
- disposing a channel pattern in said second surface;
- disposing a tube within said channel pattern;
- disposing a first metal into said mold cavity and onto said tube to encapsulate said tube, wherein said first mold segment and said tube comprise a second metal, wherein at least a portion of said first metal is said second metal; and
- pressing said first mold segment, said first metal, and said tube together in a hot isostatic pressing process to eliminate an air gap; and
- sealing said first mold segment to form said mold component.

9. The method recited in claim 8, wherein said second metal is selected from the group consisting of a copper, aluminum, beryllium-copper, and alloys, and combinations comprising at least one of the foregoing.

10. The method recited in claim 8, wherein said tubing comprises copper, and wherein said first metal and said first mold segment comprise beryllium-copper.

11. The method recited in claim 8, further comprising accessing said tube.

12. The method recited in claim 8, wherein said forming first mold segment and said second mold segment further comprises a method selected from the group consisting of casting, additive process, and combinations comprising at least one of the foregoing methods.

13. The method recited in claim 8, wherein said disposing said channel pattern further comprises a method selected from the group consisting of machining, casting, and combinations comprising at least one of the foregoing methods.

14. The method recited in claim 8, further comprises accessing said channel patterns by drilling from a second surface of at least one of said first mold segment and said second mold segment to said channel pattern.

15. The method recited in claim 8, wherein said channel pattern is disposed a distance of less than or equal to about 1 inch beneath said surface.

16. The method recited in claim 15, wherein said distance is less than or equal to about 0.5 inches.

17. A method for manufacturing a mold component having a conformal thermal management system, comprising:
- forming a first mold segment comprising a first surface having a profile comprising a detail of an article and a second surface comprising a mold cavity having a negative detail of said profile;
- disposing a channel pattern in said second surface;
- disposing a tube within said channel pattern;
- filling said mold cavity with a first metal to substantially cover said tube, wherein said first mold segment and said tube comprise a second metal, wherein at least a portion of said first metal is said second metal;
- placing a cover over said mold cavity to contain said first metal; and
- pressing said cover, said first mold segment, said first metal and said tube together in a hot isostatic pressing process to eliminate an air gap.

18. The method recited in claim 17, wherein said second metal is selected from the group consisting of a copper, aluminum, beryllium-copper, and alloys, and combinations comprising at least one of the foregoing.

19. The method recited in claim 17, wherein said tubing comprising copper, and wherein said first metal and said first mold segment comprise beryllium-copper.

20. The method recited in claim 17, further comprising accessing said tube.

21. The method recited in claim 20, wherein said distance is less than or equal to about 0.5 inches.

* * * * *